(12) United States Patent
Takahashi et al.

(10) Patent No.: US 6,398,503 B1
(45) Date of Patent: Jun. 4, 2002

(54) HIGH TEMPERATURE COMPONENT, GAS TURBINE HIGH TEMPERATURE COMPONENT AND MANUFACTURING METHOD THEREOF

(75) Inventors: Masashi Takahashi, Yokohama; Kazuhide Matsumoto, Hachioji; Masayuki Itoh, Kawasaki; Masahiro Saitou, Yokohama; Kunihiko Wada, Kawasaki; Akinori Koga, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/300,399

(22) Filed: Apr. 27, 1999

(30) Foreign Application Priority Data

Apr. 27, 1998 (JP) .............................. 10-117616

(51) Int. Cl.⁷ ................................ F01D 5/14
(52) U.S. Cl. .................................... 416/241 B
(58) Field of Search ...................... 416/241 B

(56) References Cited

U.S. PATENT DOCUMENTS

| | | | | |
|---|---|---|---|---|
| 4,492,522 A | * | 1/1985 | Rossmann et al. | ... 416/241 B X |
| 4,916,022 A | * | 4/1990 | Solfest et al. | ......... 416/241 B X |
| 5,127,795 A | * | 7/1992 | Plemmons et al. | ..... 415/115 X |
| 5,209,645 A | * | 5/1993 | Kojima et al. | .......... 416/241 B |
| 5,320,909 A | * | 6/1994 | Scharman et al. | ... 416/241 B X |
| 5,876,860 A | * | 3/1999 | Marijnissen et al. | . 416/241 B X |
| 5,975,852 A | * | 11/1999 | Nagaraj et al. | ......... 416/241 B |
| 6,045,928 A | * | 4/2000 | Tsantrizos et al. | ... 416/241 B X |
| 6,057,047 A | * | 5/2000 | Maloney | ............. 416/241 B X |

FOREIGN PATENT DOCUMENTS

| | | |
|---|---|---|
| EP | 0 583 009 | 2/1994 |
| JP | 1-18993 | 4/1989 |

OTHER PUBLICATIONS

Kojima et al.; "Durability of Thermal Barrier Coating by Low Pressure Plasma Sprayed Coating System"; Dec. 28, 1988; pp. 217–226.

* cited by examiner

Primary Examiner—Edward K. Look
Assistant Examiner—Thomas E. Lazo
(74) Attorney, Agent, or Firm—Foley & Lardner

(57) ABSTRACT

A high temperature component such a gas turbine high temperature component, for example, constituting movable or stationary blade portion, thereby comprises a base material and a thermal barrier coating coated on a surface of the base material. The thermal barrier coating has a thermal barrier characteristic controlled in accordance with an environment to which a high temperature component is exposed so as to make substantially uniform a surface temperature of the base material. The thermal barrier coating comprises a thermal barrier ceramic layer having a thermal barrier characteristic capable of being controlled by varying a thickness thereof at portions of the thermal barrier ceramic layer.

24 Claims, 5 Drawing Sheets

HIGH TEMPERATURE COMPONENT, GAS TURBINE HIGH TEMPERATURE COMPONENT AND MANUFACTURING METHOD THEREOF

BACKGROUND OF THE INVENTION

The present invention relates to a technique concerning a high temperature component used under a high temperature corrosive or oxidative atmosphere in a gas turbine, a jet engine or the like. In particular, the present invention relates to a high temperature component and a gas turbine high temperature component which can improve a thermal barrier performance by subjecting a surface of a metal base material to a thermal barrier coating (TBC) and also relates to a method of manufacturing the same.

In order to improve a heat efficiency, research and development for high temperature (a rise of working gas temperature) have been earnestly made in a prime mover such as a gas turbine, a jet engine or the like. In view of materials for high temperature, there is a tendency for a component material to be exposed to a sever working environment such as high temperature. Therefore, in gas turbine components, in particular, in a movable blade, a stationary blade and components directly exposed to a combustion gas of a combustor, the following two matters have been studied so that these components can provide an durability under a high temperature improve a cooling characteristic and to improve a heat resistant temperature of materials.

First, the following is a description on a study for improving the cooling characteristic in order to reduce a temperature of component materials.

In order to improve the cooling characteristic, it is effective to use a gas having a high heat capacity or to increase a cooling gas flow rate in principle. However, according to the method of using a high heat capacity gas or the method of increasing a cooling gas flow rate, a combustion gas temperature is reduced, and conversely, there are many cases where a heat efficiency lowers. In view of such circumstances, the following methods are employed as a method of improving a cooling performance without lowering a combustion gas temperature. More specifically, there are provided a method of increasing a heat conductivity between a material and a cooling gas and a method of increasing a contact area of the material and the cooling gas.

Film cooling or impinge cooling will be listed up as a a typical example of the method of increasing a heat conductivity between a material and a cooling gas. Moreover, a return flow structure of a blade cooling passage is mentioned as a typical example of the method of increasing a contact area of the material and the cooling gas. As described above, a heat is effectively eliminated as occasion demands. However, in any case of using these methods, a structure of equipments is made into a large size, and the component structure becomes complicated. For this reason, a manufacturing cost of equipments is increased and the system becomes complicated.

Next, the following is a description on a study for improving a heat resistant temperature of the material.

Conventionally, as a heat resisting structural material, a unidirectionally solidified or monocrystalized superalloy has been developed. The superalloy uses any one of Ni-base, Co-base or Fe-base material as a main component. On the other hand, there has been developed an intermetallic compound which is excellent in oxidation resistance by adding Nb- and Mo-base element or the like, and thereby, a trial of further improving a strength to a high temperature is made. However, in the unidirectionally solidified or monocrystalized superalloy, a usable critical temperature is 1000° C. at most in view of a melting point of the superalloy. Moreover, in the case of the superalloy to which Nb- and Mo-base element are added in order to improve an oxidation resistance, there is a problem that a workability is made worse and the manufacturing cost thereof becomes high.

Moreover, there has been developed a method of improving a heat resistance of a high temperature component by applying a ceramic material, which has a high melting point and is excellent in an oxidation resistance and in a corrosion resistance, to the high temperature component. In fact, a SiC- and $Si_3N_4$-base ceramic is applied as the high temperature component. However, the ceramic has a weak toughness in comparison with a metallic material, and there is therefore provided a problem that a workability is made worse, and an involved cost becomes high. For this reason, many problems have caused in order to realize a high temperature resisting strength and cost decreasing to widely use the ceramic as a structural material of the high temperature component.

On the other hand, there is a method of using a metallic material having an excellent toughness as a base material of the high temperature component, and subjecting a surface of the metal base material to the thermal barrier coating (TBC), and thus, improving a heat resistance of the high temperature component. The thermal barrier coating is an oxide-base ceramic layer having a low heat conductivity, and a heat is cut off by forming the thermal barrier coating on the surface of the metal base material so as to prevent a rise of the temperature of a metal base material.

For example, as disclosed in Japanese Patent Laid-open Publication No. SHO-62-211387, there has been proposed a method of forming a thermal barrier ceramic layer having a thickness of a few hundred $\mu$m on the surface of a metal base material so that a rise of the temperature on the surface of the metal base material can be reduced by several tens of degree (° C.). According to this method, it is possible to restrain the rise of the temperature on the surface of the metal base material. Therefore, a gas turbine can be made high temperature, and that is, in the thermal barrier coating, the thicker the thickness of the thermal barrier ceramic layer is, the more a thermal barrier performance is excellent, and thereby, it is possible to reduce a temperature of the metal base material. Further, by subjecting the surface of the metal base material to thermal barrier coating, a heat flux from a combustion gas side to a cooling air side becomes small. Thus, a cooling gas flow rate can be reduced.

However, in the thermal barrier ceramic layer, to which the aforesaid coating is subjected, a crack and peeling from the base material constitute the great problem. For this reason, various research and development have been made in the prior art in order to solve the problem of the peeling.

A two-layer structure is representative of the thermal barrier coating for solving the problem of peeling. The two-layer structure is formed by coating the following two layers, that is, a MCrAlY alloy layer (M is Fe, Co or Ni) coated on the surface of the metal base material, and an oxide-base ceramic layer having a low heat conductivity coated on a surface of the MCrAlY alloy layer. In this case, a zirconia-base ceramic is used as the oxide-base ceramic layer.

The thermal barrier coating having the two-layer structure is usually formed by a thermal spray process. However, in the case where coating is carried out in an atmospheric air, the thermal barrier coating layer becomes porous, and for this reason, there is a problem that an adhesive strength to the metal base material lowers, or corrosion resistance and oxidation resistance are deteriorated. In order to solve such problems, in recent years, there has been developed a method of carrying out a plasma spraying in a low pressure inert gas atmosphere substantially excluding an air (which is generally called as a low pressure plasma spraying) and thereby, a durability of the thermal barrier coating has been greatly improved.

Various studies about a material for forming the thermal barrier ceramic layer have been made.

More specifically, in zirconia ($ZrO_2$), a phase transformation takes place in the vicinity of 1200° C.; for this reason, an improvement in a phase stabilization and heat cycle characteristic is achieved by adding an additive for stabilizing the zirconia.

Moreover, in the case of forming the thermal barrier ceramic layer, a thermal barrier coating layer having a columnar structure is formed with the use of an electron beam physical vapor deposition (EB-PVD), and thereby, the structure is improved so as to make long a lifetime of the gas turbine.

However, in the aforesaid thermal barrier coating, it is a matter of general that a zirconia-base ceramic having a low heat conductivity is used, and a thermal barrier performance has not been controlled. For this reason, it is impossible to obtain thermal barrier coating having an excellent thermal barrier performance.

Moreover, for example, in a gas turbine movable blade, a gas turbine stationary blade and a combustor, which are exposed to a high temperature combustion gas, it is a matter of course that a temperature load condition is different depending upon portions of the blade to be exposed. However, almost no control is carried out so as to obtain a proper thermal barrier performance in accordance with the temperature load condition, and a thickness of a thermal barrier ceramic layer is merely varied. Thus, the thermal barrier ceramic layer has the same thickness everywhere in the portions thereof, and for this reason, the thermal barrier characteristics in these portions are the same, and the surface temperature of the metal base material which is a strengthening member tends to be considerably different at the portions thereof.

As described above, the thermal barrier characteristic mentioned above is not taken into consideration, and accordingly, there are the following problems. More specifically, many cooling medium are required, and further, a temperature gradient in a thickness direction is relatively great, and for this reason, there exists a hot spot having local high temperature portion due to a gas holder (spot) such as a combustion gas and a cooling gas. Therefore, it is necessary to improve a lifetime of the metal base material, a heat efficiency of a gas turbine and reliability.

SUMMARY OF THE INVENTION

An object of the present invention is to eliminate the problems or defects mentioned above and to provide a high temperature component and a manufacturing method thereof capable of controlling a thermal barrier performance of a thermal barrier coating in accordance with an environment to which the component is exposed and making uniform a surface temperature of a base material so as to improve a thermal barrier characteristic.

Another object of the present invention is to provide a gas turbine high temperature component and a manufacturing method thereof capable of making uniform a surface temperature of a metal base material in the thermal barrier coating of a gas turbine used in a combustion gas atmosphere and improving a heat efficiency, lifetime and reliability in the gas turbine.

These and other objects can be achieved according to the present invention by providing, in one aspect, a high temperature component comprising:

a base material; and a thermal barrier coating coated on a surface of the base material, wherein the thermal barrier coating has a thermal barrier characteristic controlled in accordance with an environment to which a high temperature component is exposed so as to make substantially uniform a surface temperature of the base material.

In a preferred embodiment in this aspect, the surface temperature of the base material has a difference in temperature within 100° C. between portions thereof.

The thermal barrier coating comprises a thermal barrier ceramic layer and a thermal barrier characteristic of the thermal barrier ceramic layer is controlled by varying a thickness or porosity thereof at portions of the thermal barrier ceramic layer.

In another aspect of the present invention, there is provided a gas turbine high temperature component comprising:

a metal base material made of a heat resistant alloy essentially consisting of at least one of Ni-base, Co-base or Fe-base; and.

a thermal barrier coating coated on a surface of the metal base material, wherein the thermal barrier coating has a thermal barrier characteristic controlled in accordance with an environment to which a high temperature component is exposed so as to make substantially uniform a surface temperature of the base material.

In a preferred embodiment in this aspect, the gas turbine high temperature component is at least one of a movable blade and a stationary blade.

The thermal barrier coating comprises a thermal barrier ceramic layer and at least one thermal barrier ceramic layer formed to a leading edge surroundings or a trailing edge surroundings of the movable blade or the stationary blade having a relatively high temperature has a thickness larger than that of another portion of the blade. The thermal barrier ceramic layer has a thickness ranging from 0.1 mm or more to 1.0 mm or less on a thicker side thereof and a thickness ranging from 0 mm or more to 0.5 mm or less on a thinner side thereof and the thickness of the thinner side thermal barrier ceramic layer is thinner than the thicker side thermal barrier ceramic layer.

The thermal barrier coating comprises a thermal barrier ceramic layer and the thermal barrier ceramic layer formed on a back side of the movable blade or the stationary blade having a relatively high temperature has a thickness larger than that of the thermal barrier ceramic layer formed on a belly side thereof having a relatively low temperature. The thermal barrier ceramic layer has a thickness ranging from 0.1 mm or more to 1.0 mm or less on a thicker side thereof and a thickness ranging from 0 mm or more to 0.5 mm or less on a thinner side thereof and the thickness of the thinner side thermal barrier ceramic layer is thinner than the thicker side thermal barrier ceramic layer.

The thermal barrier coating comprises a thermal barrier ceramic layer and at least one thermal barrier ceramic layer formed to a leading edge surroundings or a trailing edge surroundings of the movable blade or the stationary blade having a relatively high temperature has a porosity larger than that of another portion of the blade.

A surface temperature of the metal base material is made uniform by making higher a porosity of a back side of the movable or stationary blade having a relatively high temperature than that of a belly side thereof. The porosity of the thermal barrier ceramic layer ranges from 10% or more to 40% or less on a higher side thereof and ranges from 2% or more to 20% or less on a lower side thereof.

An oxide-base ceramic is used as a material of the thermal barrier ceramic layer and the oxide-base ceramic essentially comprises $ZrO_2$ and at least one or more of additives MgO, CaO, $Y_2O_3$ or $CeO_2$. An oxide-base ceramic is used as a material of the thermal barrier ceramic layer and the oxide-base ceramic essentially comprises at least one of $Al_2O_3$, $HfO_2$, $ThO_2$ or BeO.

The surface temperature of the base material has a difference in temperature within 100° C. between portions thereof. The thermal barrier coating comprises a thermal barrier ceramic layer and a thermal barrier characteristic of the thermal barrier ceramic layer is controlled by varying a thickness or porosity thereof at portions thereof.

In a further aspect of the present invention, there is provided a method of manufacturing a high temperature component comprising the steps of:

preparing a base material; and applying a thermal barrier coating comprising a thermal barrier ceramic layer on a surface of the base material by varying at least one of thickness or porosity of the thermal barrier ceramic layer at portions thereof.

In a still further aspect of the present invention, there is provided a method of manufacturing a gas turbine high temperature component comprising the steps of:

preparing a metal base material made of a heat resistant alloy essentially comprising at least one of Ni-base, Co-base or Fe-base; and applying a thermal barrier coating comprising a thermal barrier ceramic layer on a surface of the metal base material by varying at least one of thickness or porosity of the thermal barrier ceramic layer at portions thereof.

In a preferred embodiment in this aspect, the thermal barrier ceramic layer is formed by spraying a raw powder of a thermal barrier ceramic material at a high speed by means of heating source such as plasma.

A supply amount of raw powder, a grain size of the raw powder, a feed rate of a thermal spraying gun, an angle of the thermal spraying gun, a spray distance and a spray power are optimized and a deposition rate which is a coating thickness formed per one pass is varied so as to vary a thickness or porosity of the thermal barrier ceramic layer depending upon portions to be sprayed.

In a case of forming a thermal barrier ceramic layer on a metal base material, a target material is heated and vaporized by means of an electron beam and the vapor thus obtained is deposited on the surface of the metal base material so as to form the thermal barrier ceramic layer. The raw powder of the thermal barrier ceramic is passed through a plate having a different space ratio so as to vary the deposition rate.

According to the present invention of the characters mentioned above, in one aspect, it is possible to make uniform the surface temperature of the base material by varying a thermal barrier characteristic of the thermal barrier coating depending upon portions of the high temperature component. Thus, the surface temperature difference of the base material between the portions is made little, so that a lifetime of the base material can be improved, and also, a reliability of the high temperature component can be secured. Moreover, the high temperature component is applicable to an outer wall of a jet engine or a rocket which is exposed to a high temperature environment.

Furthermore, in this aspect, the surface temperature difference between the portions of the base material is set within 100° C. The surface temperature difference is within the temperature range, and thereby, it is possible to improve a lifetime of the base material.

According to the present invention, it is possible to improve the thermal barrier characteristic of the thermal barrier coating by making larger a thickness of the thermal barrier ceramic layer or by making higher a porosity thereof.

In another aspect, in the metal base material, various development have been made in the prior art in order to secure a strength. There has been variously developed a unidirectionally solidified and monocrystalized (single crystal) superalloy which essentially comprises one of Ni-base, Co-base or Fe-base. In order to secure a thermal barrier performance, a thermal barrier coating layer is formed on the metal base material, and thus, it is possible to obtain a high temperature component which has an excellent strength even in a high temperature environment.

In this aspect, in accordance with an environment to which the gas turbine high temperature component is exposed, the thermal barrier characteristic of the thermal barrier coating is varied at the portions of the high temperature component, and thereby, it is possible to make uniform the surface temperature of the metal base material. Thus, the surface temperature of the metal base material is made uniform, so that the cooling medium can be reduced. Therefore, it is possible to improve a performance of the gas turbine high temperature component. Moreover, a temperature gradient of a thickness direction is reduced, and therefore, the lifetime of the gas turbine high temperature component can be made long. In addition, it is possible to reduce a hot spot which is a factor of causing a gas holder such as a combustion gas and a cooling gas, so that a reliability of the gas turbine high temperature component can be improved.

In particular, the gas turbine component such as a movable blade or a stationary blade is a component which is exposed to a high temperature vapor. However, in the present invention, the thermal barrier characteristic of these components is improved, and thereby, a gas turbine high temperature component having a reliability in a high temperature can be obtained.

Furthermore, according to the present invention, the surface temperature difference between the portions of the base material is set within 100° C. The surface temperature difference is within the temperature range, thus improving a lifetime of the base material.

Furthermore, the thickness of the thermal barrier ceramic layer is varied, and thereby, it is possible to control a heat resistance of the thermal barrier ceramic layer determining a temperature field.

In this aspect of the present invention, by making larger the thickness of the thermal barrier ceramic layer of the leading edge portion or the trailing edge portion of the movable blade or the stationary blade whose temperature becomes high, it is possible to make uniform the surface temperature of the metal base material.

In the present invention, by making larger the thickness of the thermal barrier ceramic layer of the back side or the belly side of the movable blade or the stationary blade whose temperature becomes high, it is possible to effectively make uniform the surface temperature of the metal base material.

Furthermore., the thickness of the thermal barrier coating layer is defined as described above, and thereby, it is possible to make uniform the surface temperature of the metal base material.

According to the present invention, a pore, that is, a space has a high heat resistance, and for this reason, by varying a porosity of a material constituting the thermal barrier ceramic layer, it is possible to control a heat resistance of the thermal barrier ceramic layer determining a temperature field. In other words, the porosity of the thermal barrier ceramic layer is varied, thus making uniform the surface temperature of the metal base material.

The thicker the thickness of the thermal barrier ceramic layer, or the higher the porosity is made, the higher the heat resistance becomes, and therefore, a thermal barrier performance tends to be improved. In the gas turbine movable blade and in the gas turbine stationary blade, by making larger the heat resistance of the thermal barrier ceramic layer of the leading edge surroundings or the trailing edge surroundings which is exposed to a temperature environment more severe than that of the other portions of the blade, it is possible to make uniform the surface temperature of the metal base material.

Furthermore, in this aspect, in the gas turbine movable blade and stationary blade, by making larger the heat resistance of the thermal barrier ceramic layer on the back side which is exposed to a temperature environment more severe than the belly side, making uniform the surface temperature of the metal base material. The porosity of the thermal barrier coating layer is defined as described above, thus making uniform the surface temperature of the metal base material.

The $ZrO_2$ is used as a main component of the material of the thermal barrier ceramic layer. When the $ZrO_2$ exceeds a temperature of 1200° C., it causes a crystal transformation. For this reason, conventionally, an oxide-base ceramic has been used and the oxide-base ceramic has been partially stabilized by adding $Y_2O_3$ of about 8% to the $ZrO_2$. In the present invention, a material prepared by adding $Y_2O_3$ of about 8% to the $ZrO_2$ is used. In addition to the $Y_2O_3$, a material prepared by adding MgO, CaO or $CeO_2$ may be used.

In the present invention, $HfO_2$, $ThO_2$ or BeO having a melting point higher than that of the $ZrO_2$ may be used as a material of the thermal barrier ceramic layer, in place of the main component $ZrO_2$. Additionally, $Al_2O_3$ which can reduce cost may be used.

In a further aspect of the present invention, by varying the thickness or porosity of the thermal barrier ceramic layer, it is possible to obtain a high temperature component which can control a heat resistance of the thermal barrier ceramic layer.

In the present invention, by varying the thickness or porosity of the thermal barrier ceramic layer, it is possible to obtain a gas turbine high temperature component which can improve a thermal barrier characteristic.

In the present invention, the thermal barrier ceramic layer is formed on the metal base material by means of a thermal spraying process. According to the thermal spraying process, a raw powder is sprayed onto the metal base material at a high speed, so that a proper pore can be formed in the thermal barrier ceramic layer. Therefore, it is possible to improve a fragility of the thermal barrier ceramic layer.

In the present invention, in a case of forming the thermal barrier ceramic layer by using the thermal spraying process, by varying a supply amount of raw powder, a grain size of the raw powder, a feed rate of a thermal spraying gun, a spraying angle of the thermal spraying gun, a spraying distance and a spray power, it is possible to vary a deposition rate (ceramic layer thickness) of the thermal barrier ceramic layer. Thus, the thickness or porosity of the thermal barrier ceramic layer can be varied. In other words, these conditions are intentionally varied at portions of the thermal barrier ceramic layer, and thereby, it is possible to form a thermal barrier ceramic layer having a thickness and porosity variable at the portions thereof.

In the present invention, the thermal barrier ceramic layer is formed on the surface of the metal base material with the use of a physical vapor deposition process. According to the physical vapor deposition process, the thermal barrier ceramic layer deposited on the surface of the metal base material is formed by a longitudinal crystal growth, and therefore, the metal base material and the thermal barrier ceramic layer are hard to be peeled off from each other.

In the present invention, in the case of forming the thermal barrier ceramic layer by using the thermal spraying process or the physical vapor deposition process, a film coating is formed via a plate having different space ratio, for example, a net having a different mesh arrangement, and thereby, it is possible to vary the deposition rate of the thermal barrier ceramic layer. In other words, the space ratio is intentionally varied depending upon the: portions, and it becomes possible to form a thermal barrier ceramic layer having a thickness and porosity variable depending upon the portions thereof.

In summary, as is evident from the high temperature component, a gas turbine high temperature component and their manufacturing method of the present invention, it is possible to obtain a high temperature component capable of controlling the thermal barrier characteristic of the thermal barrier coating in accordance with an environment to which the high: temperature component is exposed. In particular, the obtained high temperature component is applicable as a gas turbine high temperature component used in a high temperature oxidative and corrosive atmosphere in a gas turbine which is used in a combustion gas atmosphere. Therefore, it is possible to provide a gas turbine high temperature component which is excellent in a heat efficiency, a lifetime and reliability of a gas turbine.

The nature and further characteristic features of the present invention will be made more clear from the following descriptions made with reference to the accompanying drawings.

DESCRIPTION OF THE PREFERRED EMBODIMENTS

A first embodiment of the present invention will be described hereunder with reference to FIG. 1 to FIG. 8.

In this embodiment, a gas turbine rotating blade which is subjected to a thermal barrier coating and a manufacturing method thereof are handled.

Figure 1:
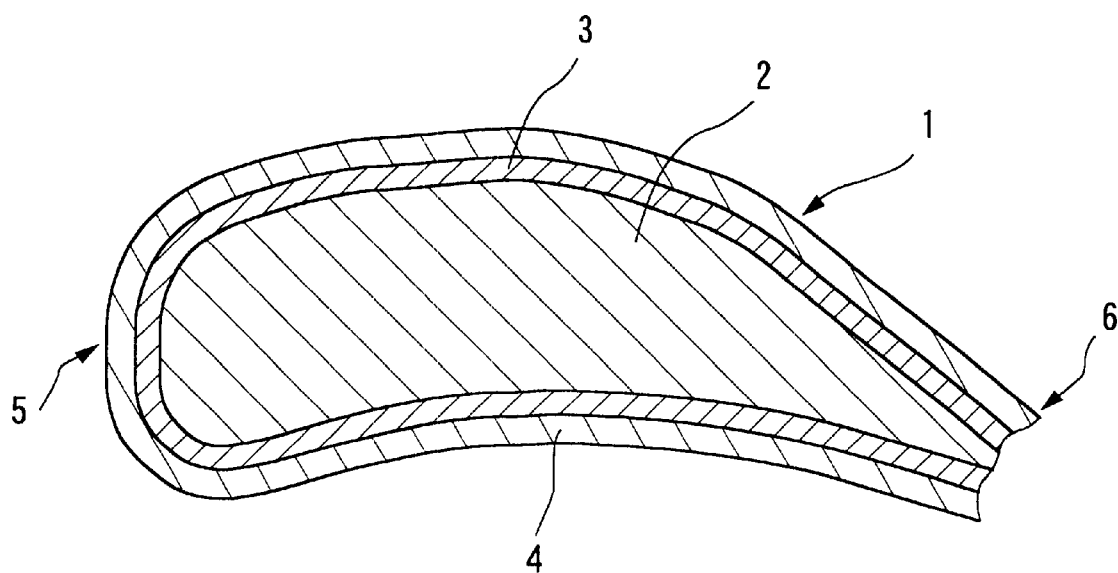
FIG. 1 is a schematic view showing a cross section of a gas turbine movable blade which is subjected to a thermal barrier coating according to one embodiment of the present invention.

FIG. 1 is a schematic view showing a cross section of a gas turbine movable blade, as a high temperature component, which is subjected to the thermal barrier coating in the embodiment of the present invention.

As shown in FIG. 1, in a gas turbine movable blade 1, a MCrAlY alloy layer 3 (M is Cr, Co or Ni), which is excellent in corrosion resistance and oxidation resistance, is formed on a rotating blade base material 2 made of a Ni-, Co- or Fe-base superalloy which is excellent in a high temperature strength, and further, a $Y_2O_3$ partially stabilized $ZrO_2$ layer 4, which has a low heat conductivity and is chemically stable, is formed on the MCrAlY alloy layer 3, and thus, a thermal barrier coating layer is composed of the MCrAlY alloy layer 3 and the $Y_2O_3$ partially stabilized $ZrO_2$ layer 4.

In the gas turbine movable blade 1 shown in FIG. 1, in particular, each thermal barrier coating of a leading edge surroundings 5 and a trailing edge surroundings 6 (portions of the leading and trailing edges and near) is exposed under the condition of a severe combustion gas temperature. For this reason, these thermal barrier coatings have a thickness more than 0.1 mm and less than 1.0 mm, and the $Y_2O_3$ partially stabilized $ZrO_2$ layer 4 is formed thicker than that of the other portion. Further, in order to improve a thermal barrier performance, these thermal barrier coatings have a porosity more than that of the other portion, that is, ranging from 10% or more to 40% or less, and thus, a surface temperature difference of the rotating blade base material 2 is set within a range of 100° C.

Figure 2:
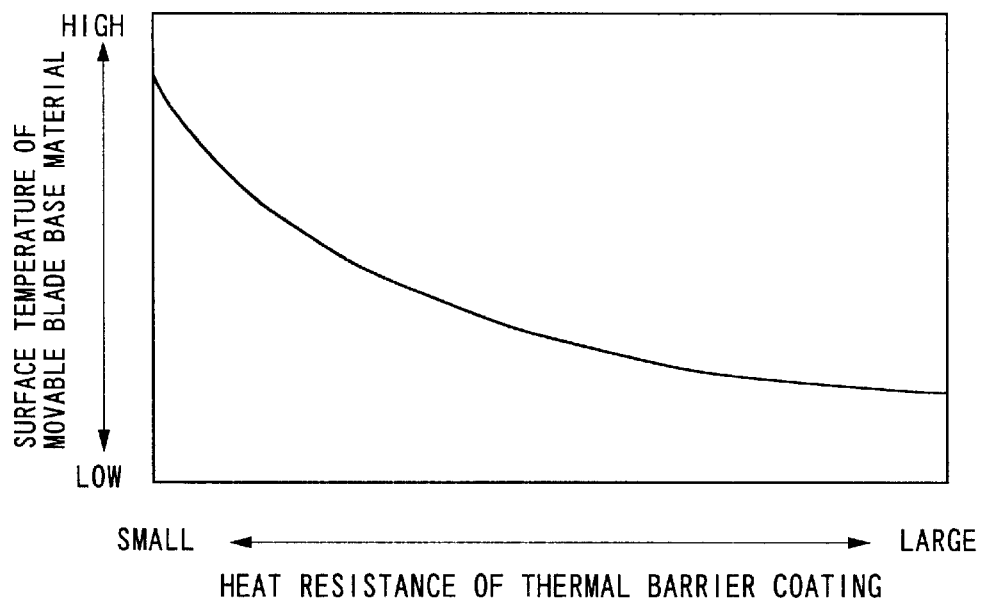
FIG. 2 is a chart showing a relationship between a heat resistance of thermal barrier coating and a surface temperature of a base material of the gas turbine movable blade in the embodiment of the present invention.

FIG. 2 is a chart showing a relationship between a heat resistance of thermal barrier coating and a surface temperature of a base material of the gas turbine movable blade.

As shown in FIG. 2, a heat resistance of the thermal barrier coating is set higher, and thereby, it is possible to make low a surface temperature of the movable blade base material as a strength member, and therefore, a thermal barrier performance can be improved. On the other hand, it is possible to vary the heat resistance of the thermal barrier coating by a thickness of the thermal barrier coating or a heat conductivity of materials constituting the thermal barrier coating. In particular, the heat conductivity of material is a physical property peculiar to its material. However, a pore having a high adiabatic effect, that is, a space, is formed and it is thereby possible to vary an absolute value of the heat conductivity.

Figure 3:
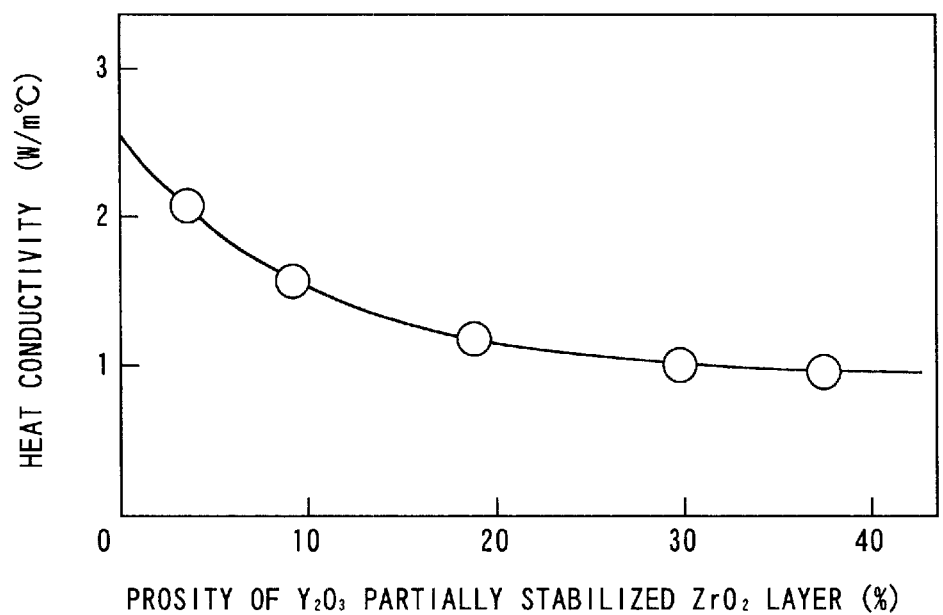
FIG. 3 is a chart showing a relationship between a porosity of a $Y_2O_3$ partially stabilized $ZrO_2$ layer and a heat conductivity in the embodiment of the present invention.

FIG. 3 is a chart showing a relationship between a porosity of the $Y_2O_3$ partially stabilized $ZrO_2$ layer and a heat conductivity.

As shown in FIG. 3, it is evident that the porosity of the $Y_2O_3$ partially stabilized $ZrO_2$ layer greatly affects to the heat conductivity. The higher the porosity is made, the lower the heat conductivity becomes.

Furthermore, the material composition of $Y_2O_3$ partially stabilized $ZrO_2$ layer is varied, and thereby, it is possible to vary an absolute value of the heat conductivity.

Figure 4:
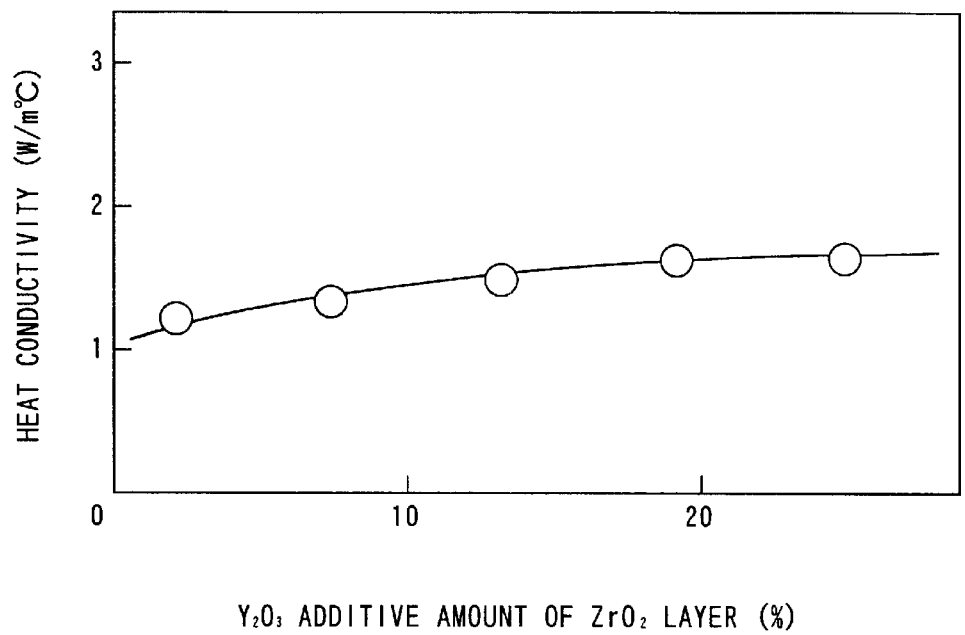
FIG. 4 is a chart showing an influence of a composition ratio of the $Y_2O_3$ partially stabilized $ZrO_2$ layer on a heat conductivity in the embodiment of the present invention.

FIG. 4 is a chart showing a relationship between a $Y_2O_3$ composition ratio and a heat conductivity in the $Y_2O_3$ partially stabilized $ZrO_2$ layer.

As shown in FIG. 4, it is evident that the composition ratio of the $Y_2O_3$ partially stabilized $ZrO_2$ layer greatly affects the heat conductivity. The smaller the $Y_2O_3$ composition ratio is made, the lower the heat conductivity becomes.

Next, the following is a description on a method of manufacturing the gas turbine movable blade 1 to which thermal barrier coating is subjected.

First, a MCrAlY alloy powder (M is Cr, Co or Ni) is introduced into a high temperature heat source such as plasma or combustion gas, and then, a melt MCrAlY alloy particle is sprayed onto a Ni-, Co- or Fe-base superalloy rotating blade which is excellent in high temperature strength, at a high speed, and thus, the MCrAlY alloy layer 3 is formed.

Thereafter, the $Y_2O_3$ partially stabilized $ZrO_2$ powder is introduced into the high temperature heat source such as plasma or combustion gas, and then, a melt $Y_2O_3$ partially stabilized $ZrO_2$ particle is sprayed onto the MCrAlY alloy layer 3 at a high speed, and thus, the $Y_2O_3$ partially stabilized $ZrO_2$ layer 4 is formed.

In the case of forming the $Y_2O_3$ partially stabilized $ZrO_2$ layer 4 of the leading edge thermal barrier coating 5 and the trailing edge thermal barrier coating 6, these coatings have a thickness and porosity greater than other portions by varying a thermal spraying process parameter such as a supply amount of a raw powder, a grain size thereof, a feed rate of a thermal spraying gun, a spray angle of the thermal spraying gun, a spraying distance, a thermal spray power or the like, and thus, a thermal barrier performance is relatively improved. Concerning the deposition rate, the thermal spraying material passes through the net having the different mesh arrangement which is a plate-like structure having a different space ratio, and then, the $Y_2O_3$ partially stabilized $ZrO_2$ layer 4 is formed.

More specifically, a raw powder amount ranges from 1 to 30 cm³/min, a grain size of raw powder ranges from 1 to 200 μm, a feed rate of thermal spraying gun ranges from 100 to 1000 mm/sec, an angle of thermal spraying gun ranges from 30 to 90°, a spray distance ranges from 50 to 300 mm and, a thermal spray power ranges 20 to 100 kW.

Figure 5:
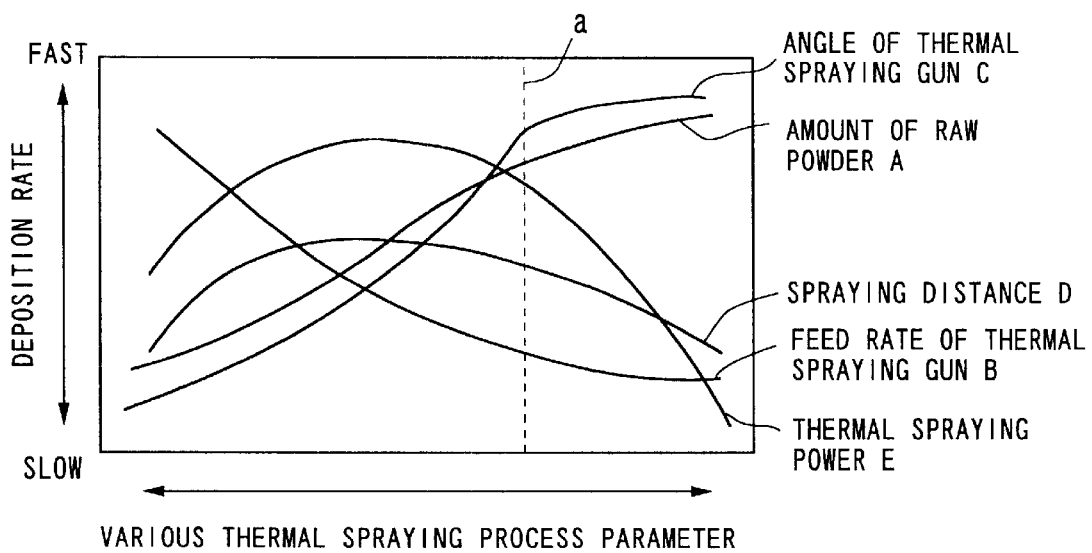
FIG. 5 is a chart showing an influence of various thermal spraying process parameters on a deposition rate by a thermal spraying process in the embodiment of the present invention.

FIG. 5 is a chart showing effects of various thermal spraying process parameters on the deposition rate in the case of forming the $Y_2O_3$ partially stabilized $ZrO_2$ layer by using the thermal spraying process.

As shown in FIG. 5, by varying various thermal spraying process parameters such as a raw powder amount A of the $Y_2O_3$ partially stabilized $ZrO_2$, a feed rate B of the thermal spraying gun, an angle C of the thermal spraying gun, a spray distance D, a thermal spray power E, it is possible to greatly vary the deposition rate. Usually, the thermal spraying process parameter for preventing the movable blade base material from being peeled off and the thermal barrier coating is set, and more specifically, various parameters are set to a value as shown by a broken line a in FIG. 5.

In the case of spraying thermal barrier coating on the gas turbine movable blade 1, by varying the thermal spraying process parameter, it becomes possible to control the deposition rate which corresponds to a thickness of the $Y_2O_3$ partially stabilized $ZrO_2$ layer formed per one pass. Thus, even in the case where the thermal spray is repeated with the same number of passes, it is possible to form the $Y_2O_3$ partially stabilized $ZrO_2$ layer having a predetermined thickness distribution. In other words, the thermal spraying process parameter is controlled in association with a portion to be sprayed, and thereby, the deposition rate varies. As a result, it is possible to manufacture the gas turbine movable blade 1 having the thicker $Y_2O_3$ partially stabilized $ZrO_2$ layer of the leading edge surroundings 5 and the trailing edge surroundings 6. In this case, preferably, the thickness of the $Y_2O_3$ partially stabilized $ZrO_2$ layer of the leading edge surroundings 5 and the trailing edge surroundings 6 ranges from 0.1 mm or more to 1.0 mm or less taking a limitation on the manufacture and durability.

Figure 6:
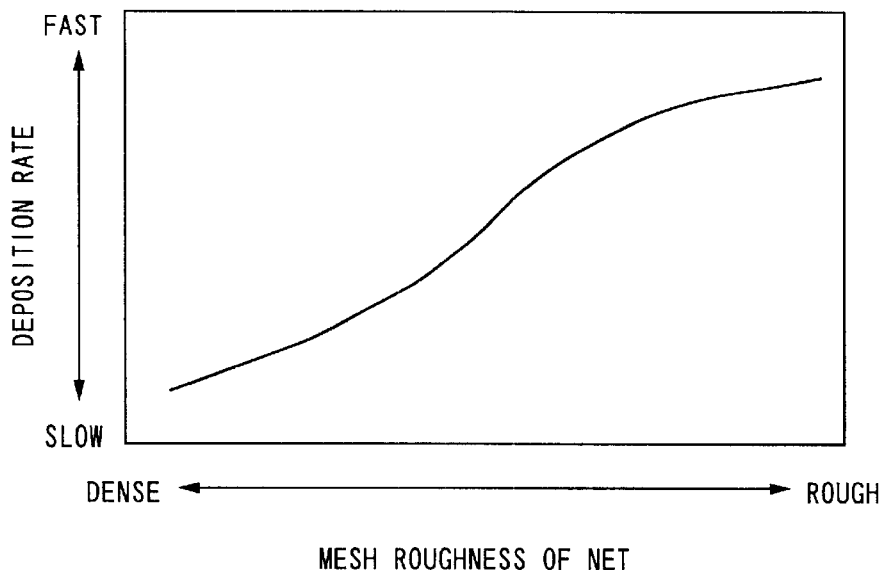
FIG. 6 is a chart showing a relationship between a mesh roughness of a net and a deposition rate by a thermal spraying process in the embodiment of the present invention.

FIG. 6 is a chart showing a relationship between the mesh roughness of the net and the deposition rate in the case of forming the $Y_2O_3$ partially stabilized $ZrO_2$ layer on the movable blade base material by the thermal spraying process.

As shown in FIG. 6, the mesh roughness of the net is made rough, and thereby, the deposition rate, which is a formed thickness of the $Y_2O_3$ partially stabilized $ZrO_2$ layer 4 per time, becomes fast. For this reason, in the case of the spraying thermal barrier coating on the gas turbine movable blade 1, the mesh roughness of the net is varied, and thereby, it is possible to control the deposition rate of the $Y_2O_3$ partially stabilized $ZrO_2$ layer 4. Thus, even in the case where the thermal spray is repeated with the same number of passes, it is possible to form a $Y_2O_3$ partially stabilized $ZrO_2$ layer 4 having a predetermined thickness distribution. In other words, the mesh roughness of the net is varied in association with a portion to be sprayed, and thereby, the deposition rate varies. As a result, it is possible to manufacture the gas turbine movable blade 1 having the thicker $Y_2O_3$ partially stabilized $ZrO_2$ layer 4 of the leading edge surroundings 5 and the trailing edge surroundings 6.

Figure 7:
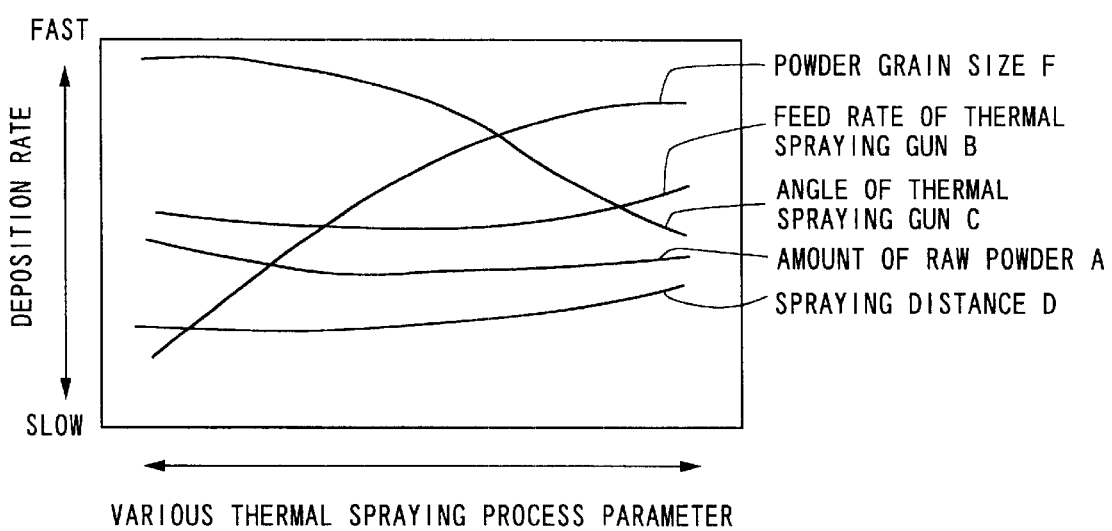
FIG. 7 is a chart showing an influence of various thermal spraying process parameters on a porosity by a thermal spraying process in the embodiment of the present invention.

FIG. 7 is a chart showing an influence of various thermal spraying process parameters on a porosity in the case of forming the $Y_2O_3$ partially stabilized $ZrO_2$ layer by means of the thermal spraying process.

As shown in FIG. 7, by varying various thermal spraying process parameters such as the raw powder amount A of the $Y_2O_3$ partially stabilized $ZrO_2$, the feed rate B of the thermal spraying gun, the powder grain size F, the angle C of the thermal spraying gun and the spray distance D, it is possible to greatly vary the porosity of the $Y_2O_3$ partially stabilized $ZrO_2$ layer. In the case of spraying thermal barrier coating on the gas turbine movable blade 1, by varying the thermal spraying process parameter, it is possible to control the porosity of the $Y_2O_3$ partially stabilized $ZrO_2$ layer. Thus, it is possible to form the $Y_2O_3$ partially stabilized $ZrO_2$ layer having different porosity depending upon parts. In other words, the thermal spraying process parameter is controlled in association with the portion to be sprayed, and thereby, the porosity varies. As a result, it is possible to manufacture the gas turbine movable blade 1 having an improved thermal barrier performance by making high the porosity of the $Y_2O_3$ partially stabilized $ZrO_2$ layer of the leading edge surroundings 5 and the trailing edge surroundings 6. In this case, preferably, the porosity ranges from 10% or more to 40% or less because the strength lowers in the case where the porosity is made high.

Furthermore, in the case of forming the $Y_2O_3$ partially stabilized $ZrO_2$ layer 4 on the MCrAlY alloy layer 3 (M is Cr, Co or Ni) of the gas turbine rotating blade 1, there may be employed a physical vapor deposition process of heating and vaporizing a target made of $Y_2O_3$ partially stabilized $ZrO_2$ by means of a high temperature source such as an electron beam, and depositing a vapor (steam) thus obtained.

Figure 8:
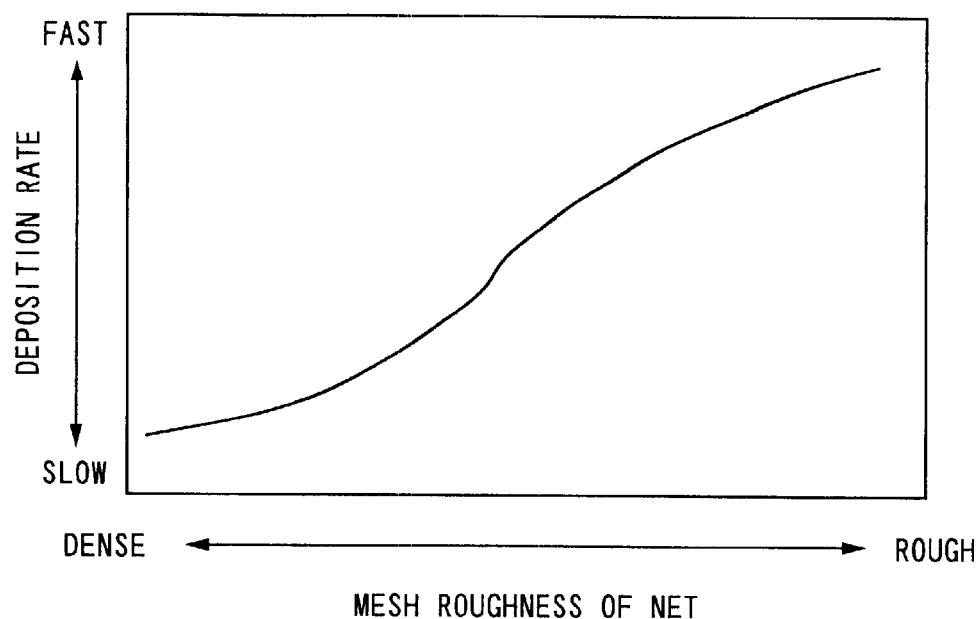
FIG. 8 is a chart showing a relationship between a mesh roughness of a net and a deposition rate by a physical vapor deposition process in the embodiment of the present invention.

FIG. 8 is a chart showing a relationship between the mesh roughness of the net and the deposition rate in the case of forming the $Y_2O_3$ partially stabilized $ZrO_2$ layer through the mesh of the net by means of the physical vapor deposition process.

As shown in FIG. 8, the mesh roughness of the net is made rough, and thereby, the deposition rate becomes fast. For this reason, in the case of spraying the thermal barrier coating on the gas turbine movable blade 1, the mesh roughness of the net is varied, and thereby, it is possible to control the deposition rate of the $Y_2O_3$ partially stabilized $ZrO_2$ layer 4. Thus, it is possible to form the $Y_2O_3$ partially stabilized $ZrO_2$ layer 4 having a predetermined thickness distribution. In other words, when a physical vapor deposition is carried out in a state of previously covering the gas turbine movable blade with the net having different mesh arrangement, the deposition rate is different depending upon the portions. As a result, it is possible to manufacture a gas turbine movable blade 1 having the thicker $Y_2O_3$ partially stabilized $ZrO_2$ layer of the leading edge surroundings 5 and the trailing edge surroundings 6.

The following matter is evident from the present invention. That is, it is possible to readily control the thermal barrier performance by varying a heat resistance of the thermal barrier coating in the gas turbine movable blade. Thus, the heat resistance of thermal barrier coating is controlled in accordance with a combustion gas condition to which the gas turbine movable blade is exposed, making uniform the surface temperature of the movable blade base material. More specifically, in the case of subjecting the leading edge surroundings and the trailing edge surroundings, which are exposed to a relatively severe combustion gas condition, to the thermal barrier coating, the heat resistance of the thermal barrier coating is relatively made high as compared with the other portions, thus making uniform the surface temperature of the movable blade base material. Then, it is possible to make high the heat resistance of the thermal barrier coating by making thick a thickness of the $Y_2O_3$ partially stabilized $ZrO_2$ layer, making high the porosity thereof, and making small a composition ratio thereof.

In particular, according to the present invention, the thermal barrier coating of the leading edge surroundings and the trailing edge surroundings, which are exposed to a severe combustion gas temperature condition, has an improved thermal performance, so that the surface temperature of the movable blade base material can be made uniform. Thus, in order to control the thermal barrier performance in accordance with the temperature condition to which the gas turbine movable blade is exposed, there is no need of carrying out unnecessary cooling. As a result, it is possible to reduce an absolute quantity of the cooling medium and to improve the gas turbine efficiency.

Further, the thermal barrier performance is controlled in accordance with the temperature condition to which the gas turbine movable blade is exposed, and therefore, it is possible to reduce the surface temperature of the movable blade base material of portions which are exposed to a severe combustion gas temperature condition, a temperature gradient of the thickness direction of the movable blade base material, and a thermal stress of the movable blade base material. As a result, the lifetime of the gas turbine can be expanded.

Furthermore, the thermal barrier performance is controlled in accordance with the temperature condition to which the gas turbine rotating blade is exposed, and therefore, it is possible to reduce a locally high temperature hot spot which is generated by a gas holder such as a combustion gas and a cooling gas. As a result, it is possible to prevent a sudden oxidization of the MCrAlY layer and the base material causing peeling of the thermal barrier coating and to reduce a generation of a great thermal stress.

In addition to the $Y_2O_3$ partially stabilized $ZrO_2$, other materials such as $Al_2O_3$, $HfO_2$, $ThO_2$ and BeO will be listed up as an oxide-base ceramics which have chemically stable low heat conductivity effective as a thermal barrier coating material. The heat conductivity is a physical property peculiar to the material, and for this reason, the heat conductivity of the oxide-base ceramic is greatly different. Therefore, the thermal spraying material is controlled in association with the thermally sprayed portions. As a result, it is possible to manufacture a gas turbine movable blade which is subjected to the thermal barrier coating having an improved thermal barrier performance of the leading edge surroundings and the trailing edge surroundings.

Figure 9:
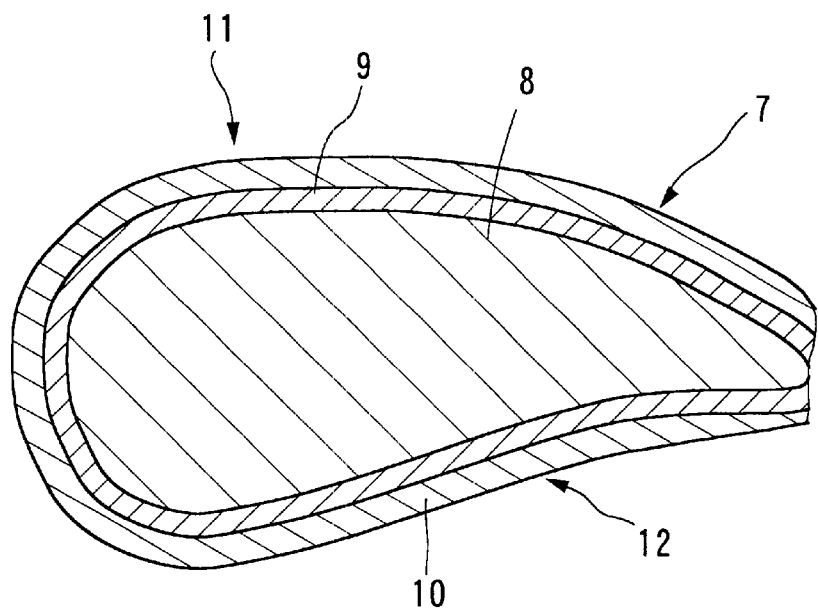
FIG. 9 is a schematic view showing a cross section of a gas turbine stationary blade which is subjected to a thermal barrier -coating according to another embodiment of the present invention.

FIG. 9 represents a second embodiment of the present invention, in which a gas turbine stationary blade which is subjected to the thermal barrier coating and a manufacturing method thereof are handled.

FIG. 9 is a schematic view showing a cross section of a gas turbine stationary blade which is subjected to the thermal barrier coating of this second embodiment of the present invention.

As shown in FIG. 9, in a gas turbine stationary blade 7, a MCrAlY alloy layer 9 (M is Cr, Co or Ni), which is excellent in corrosion resistance and oxidation resistance, is formed on a stationary blade base material 8 made of a Ni-, Co- or Fe-base superalloy which is excellent in a high temperature strength, and further, a $Y_2O_3$ partially stabilized $ZrO_2$ layer 10, which has a low heat conductivity and is chemically stable, is formed on the MCrAlY alloy layer 9. In this manner, the thermal barrier coating layer is composed of the MCrAlY alloy layer 9 and the $Y_2O_3$ partially stabilized $ZrO_2$ layer 10.

In the gas turbine stationary blade 7 shown in FIG. 9, in particular, each of the thermal barrier coating s of a back side 11 and a belly side 12 is relatively exposed under the condition of a severe combustion gas temperature. For this reason, these thermal barrier coatings have a thickness more than 0.1 mm and less than 1.0 mm, and the $Y_2O_3$ partially stabilized $ZrO_2$ layer 4 is formed thicker than that of the other portion. Further, in order to improve a thermal barrier performance, these thermal barrier coatings have a porosity more than that of the other portion, that is, ranging from 10% or more to 40% or less, and thus, a surface temperature difference of the stationary blade base material 8 is set within a range of 100° C.

In the following, a method of manufacturing the gas turbine stationary blade 7 of the above embodiment to which thermal barrier coating is subjected will be mentioned.

First, a MCrAlY alloy powder (M is Cr, Co or Ni) is introduced into a high temperature heat source such as plasma or combustion gas, and then, a molten MCrAlY alloy particle is sprayed onto a Ni-, Co- or Fe-base superalloy stationary blade 8 which is excellent in high temperature resisting strength, at a high speed, and thus, a MCrAlY alloy layer 9 is formed.

Thereafter, the $Y_2O_3$ partially stabilized $ZrO_2$ powder is introduced into the high temperature heat source such as plasma or combustion gas, and then, a molten $Y_2O_3$ partially stabilized $ZrO_2$ particle is sprayed onto the MCrAlY alloy layer 9 at a high speed, and thus, the $Y_2O_3$ partially stabilized $ZrO_2$ layer 10 is formed. In the case of forming the thermal barrier coating $Y_2O_3$ partially stabilized $ZrO_2$ layer 4 of the back side 11 and the belly side 12 of the turbine blade, these coatings have thickness and porosity greater than those of the other portions not exposed to the severe high temperature condition by varying the thermal spraying process parameter such as a supply amount of the raw powder, the grain size of the raw powder, the feed rate of the thermal spraying gun, the angle of the thermal spraying gun, the spray distance, the thermal spray power or the like, and thus, the thermal barrier performance is relatively improved. Concerning the deposition rate corresponding to the thickness of the sprayed portion, the thermal spraying material passes through the net having different mesh which is a plate-like structure having a different space ratio, and then, the $Y_2O_3$ partially stabilized $ZrO_2$ layer 10 is formed.

More specifically, the raw powder amount ranges from 1 to 30 cm$^3$/min, the grain size of the raw powder ranges from 1 to 200 μm, the feed rate of the thermal spraying gun ranges from 100 to 1000 mm/sec, then angle of the thermal spraying gun ranges from 30 to 90°, the spray distance ranges from 50 to 300 mm and the thermal spray power ranges 20 to 100 kW.

In the case of manufacturing the gas turbine stationary blade 7, like the aforesaid gas movable rotating blade 1, as shown in FIG. 5, by varying various thermal spraying process parameters such as a raw powder amount A of the $Y_2O_3$ partially stabilized $ZrO_2$, the feed rate of the thermal spraying gun, the angle of the thermal spraying gun, the spray distance, the thermally spraying power, it is possible to greatly vary the deposition rate. Therefore, in the case of spraying the thermal barrier coating on the gas turbine stationary blade 7 by varying the thermal spraying process parameter, it is possible to control the deposition rate which corresponds to the thickness of $Y_2O_3$ partially stabilized $ZrO_2$ layer 10 formed per one pass. Thus, even in the case where the thermal spray is repeated with the same number of passes, it is possible to form the $Y_2O_2$ partially stabilized $ZrO_2$ layer having a predetermined thickness distribution. In other words, the thermal spraying process parameter is controlled in association with the portion to be sprayed and the deposition rate varies. As a result, it is possible to manufacture a gas turbine stationary blade 7 having the thicker $Y_2O_3$ partially stabilized $ZrO_2$ layer of the back side 11 as compared with the belly side 12.

As shown in FIG. 6, the mesh roughness of the net is made rough by means of the thermal spraying process, and thereby, it is possible to vary the deposition rate. Therefore, in the case of spraying the thermal barrier coating on the gas turbine stationary blade 7, the mesh roughness of the net is varied, and thereby, it is possible to control the deposition rate of the $Y_2O_3$ partially stabilized $ZrO_2$ layer 10. Thus, even in the case where the thermal spray is repeated with the same number of passes, it is possible to form the $Y_2O_3$ partially stabilized $ZrO_2$ layer 10 having a predetermined thickness distribution. In other words, the mesh roughness of the net is varied in association with the portion to be sprayed and the deposition rate varies. As a result, it is possible to manufacture the gas turbine stationary blade 7 having the thicker $Y_2O_3$ partially stabilized $ZrO_2$ layer 10 of the back side 12 as compared with the belly side 12.

As shown in FIG. 7, by varying various thermal spraying process parameters such as the raw powder amount of the $Y_2O_3$ partially stabilized $ZrO_2$, the powder grain size, the feed rate of the thermal spraying gun, the spraying angle of the thermal spraying gun and the spraying distance and power, it is possible to largely vary the porosity of the $Y_2O_3$ partially stabilized $ZrO_2$ layer. In the case of spraying thermal barrier coating on the gas turbine stationary blade 7, by varying the thermal spraying process parameter, it is possible to control the porosity of the $Y_2O_3$ partially stabilized $ZrO_2$ layer 10. Thus, it becomes possible to form the $Y_2O_3$ partially stabilized $ZrO_2$ layer 10 having different porosity at the portions to be sprayed. In other words, the thermal spraying process parameter is controlled in association with the portion to be sprayed, and thereby, the porosity varies. As a result, it is possible to manufacture the gas turbine stationary blade 7 having an improved thermal barrier performance by making high the porosity of the $Y_2O_3$ partially stabilized $ZrO_2$ layer 10 of the back side 11 as compared with the belly side 12.

As shown in FIG. 8, the mesh roughness of the net is made rough by means of the physical vapor deposition process thereby to largely vary the deposition rate. Therefore, in the case of spraying thermal barrier coating on the gas turbine stationary blade 7, the mesh roughness of the net is varied, and thereby, the deposition rate of the $Y_2O_3$ partially stabilized $ZrO_2$ layer 10 can be controlled. Thus, it is possible to form the $Y_2O_3$ partially stabilized $ZrO_2$ layer 10 having a predetermined thickness distribution by the physical vapor deposition process. In other words, when the physical vapor deposition is carried out in a state of previously covering the gas turbine stationary blade with the net of different mesh arrangement, the deposition rate is different at the portions to be sprayed. As a result, it is possible to manufacture the gas turbine stationary blade 7 having a thicker $Y_2O_3$ partially stabilized $ZrO_2$ layer 10 of the back side 11 as compared with the belly side 12.

In the gas turbine stationary blade 7 of the present invention, it is possible to readily control the thermal barrier performance by varying the heat resistance of the thermal barrier coating. Thus, the heat resistance of the thermal barrier coating is controlled in accordance with a combustion gas condition to which the gas turbine stationary blade is exposed, thus making uniform the surface temperature of the stationary blade base material 8. More specifically, the heat resistance of the thermal barrier coating of the back side 11, which is exposed to a severe combustion gas condition, is made higher than that of the thermal barrier coating of the belly side 12, making uniform the surface temperature of the stationary blade base material 8. Then, it is possible to make high the heat resistance of the thermal barrier coating by making thick a thickness of the $Y_2O_3$ partially stabilized $ZrO_2$ layer 10, making high the porosity of the $Y_2O_3$ partially stabilized $ZrO_2$ layer 10, and making small the composition ratio of the $Y_2O_3$ partially stabilized $ZrO_2$ layer.

Further, according to the present invention, the thermal barrier coating of the back side 11 which is exposed to the severe combustion gas temperature condition, has an improved thermal performance, so that the surface temperature of the stationary blade base material 8 can be made uniform. Thus, in order to control the thermal barrier performance in accordance with the temperature condition to which the gas turbine rotating blade is exposed, there is no need of carrying out unnecessary cooling. As a result, it is possible to reduce an absolute quantity of the cooling medium and to improve the gas turbine efficiency.

Further, the thermal barrier performance is controlled in accordance with the temperature condition to which the gas turbine movable blade is exposed, and therefore, it is possible to reduce the surface temperature of the stationary blade base material 8 of the portions which are exposed to a severe combustion gas temperature condition, to reduce a temperature gradient of the thickness direction of the stationary blade base material 8, and and to reduce a thermal stress of the stationary blade base material 8. As a result, the lifetime of gas turbine can be expanded.

Further, the thermal barrier performance is controlled in accordance with the temperature condition to which the gas turbine stationary blade is exposed, and therefore, it is possible to reduce a hot spot. As a result, it is possible to prevent a sudden oxidization of the MCrAlY layer 9 and the stationary blade base material 8 causing the peeling of the thermal barrier coating and to reduce the generation of a great thermal stress.

In the above embodiments there has been explained the cases where the gas turbine movable blade 1 and the gas turbine stationary blade 7 are subjected to the thermal barrier coating. The present invention is applicable to a high temperature component such as an outer wall of a jet engine or a rocket which is exposed to a high temperature environment.

What is claimed is:

1. A high temperature component comprising:
   a base material; and
   a thermal barrier coating coated on a surface of the base material, said thermal barrier coating consisting essentially of first and second layers,
   wherein the first layer comprises a MCrAlY alloy layer where M is selected from the group Cr, Co or Ni,
   wherein the second layer comprises a low thermal conductivity ceramic material comprising $ZrO_2$ partially stabilized with $Y_2O_3$ and
   wherein the ceramic material of the second layer of the thermal barrier coating has at least one thermal barrier layer characteristic that affects its thermal conductivity and that varies over the surface of the thermal barrier coating according to a profile that provides essentially a uniform surface temperature on the surface of the base material.

2. A high temperature component according to claim 1, wherein said profile is such as to provide a surface temperature of the surface the base material that differs in temperature within 100° C. between portions thereof.

3. A high temperature component comprising:
   a base material; and
   a thermal barrier coating coated on a surface of the base material, said thermal barrier coating consisting essentially of first and second layers,
   wherein the first layer comprises a MCrAlY alloy layer, where M is selected from the group Cr, Co or Ni, and
   wherein the second layer comprises a low thermal conductivity ceramic material comprising $ZrO_2$ partially stabilized with $Y_2O_3$,
   wherein the ceramic material of the second layer of the thermal barrier coating has at least one thermal barrier layer characteristic that affects its thermal conductivity and that varies over the surface of the thermal barrier coating according to a profile that provides essentially a uniform surface temperature on the surface of the base material, and wherein said at least one thermal barrier layer characteristic is the thickness of the second layer.

4. A high temperature component comprising:

a base material; and a thermal barrier coating coated on a surface of the base material, said thermal barrier coating consisting essentially of first and second layers, wherein the first layer comprises a MCrAlY alloy layer, where M is selected from the group Cr, Co or Ni, wherein the second layer comprises a low thermal conductivity ceramic material comprising $ZrO_2$ partially stabilized with $Y_2O_3$, wherein the ceramic material of the second layer of the thermal barrier coating has at least one thermal barrier layer characteristic that affects its thermal conductivity and that varies over the surface of the thermal barrier coating according to a profile that provides essentially a uniform surface temperature on the surface of the base material, and wherein the at least one thermal barrier characteristic is the porosity of the ceramic material of the second layer.

5. A gas turbine high temperature component comprising:

a metal base material made of a high resistant alloy essentially consisting of at least one of Ni-base, Co-base or Fe-base; and a thermal barrier coating coated on a surface of the metal base material, said thermal barrier consisting essentially of first and second layers, wherein the first layer comprises a MCrAlY alloy layer where M is selected from the group Cr, Co or Ni, and wherein the second layer comprises $ZrO_2$ partially stabilized with $Y_2O_3$ and has at least one thermal barrier layer characteristic that effects its thermal conductivity and that varies over the surface of the thermal barrier coating according to a profile that provides essentially a uniform temperature over the surface of the base material.

6. A gas turbine high temperature component according to claim 5, wherein the gas turbine high temperature component is at least one of a movable blade and a stationary blade.

7. A gas turbine high temperature component according to claim 6, wherein said thermal barrier coating comprises a thermal barrier ceramic layer and at least one thermal barrier ceramic layer formed to a leading edge portion or a trailing edge portion of the movable blade or the stationary blade having a relatively high temperature has a thickness larger than that of another portion of the blade.

8. A gas turbine high temperature component according to claim 7, wherein the thermal barrier ceramic layer has a thickness ranging from 0.1 mm or more to 1.0 mm or less on a thicker side thereof and a thickness ranging from 0 mm or more to 0.5 mm or less on a thinner side thereof and the thickness of the thinner side thermal barrier ceramic layer is thinner than the thicker side thermal barrier ceramic layer.

9. A gas turbine high temperature component according to claim 6, wherein said thermal barrier coating comprises a thermal barrier ceramic layer and the thermal barrier ceramic layer formed on a back side of the movable blade or the stationary blade having a relatively high temperature has a thickness larger than that of the thermal barrier ceramic layer formed on a belly side thereof having a relatively low temperature.

10. A gas turbine high temperature component according to claim 9, wherein a thermal barrier ceramic layer has a thickness ranging from 0.1 mm or more to 1.0 mm or less on a thicker side thereof and a thickness ranging from 0 mm or more to 0.5 mm or less on a thinner side thereof and the thickness of the thinner side thermal barrier ceramic layer is thinner than the thicker side thermal barrier ceramic layer.

11. A gas turbine high temperature component according to claim 6, wherein said thermal barrier coating comprises a thermal barrier ceramic layer and at least one thermal barrier ceramic layer formed to a leading edge surroundings or a trailing edge surroundings of the movable blade or the stationary blade having a relatively high temperature has a porosity larger than that of another portion of the blade.

12. A turbine high temperature component according to claim 11, wherein the porosity of the thermal barrier ceramic layer ranges from 10% or more to 40% or less on a higher side thereof and ranges from 2% or more to 20% or less on a lower side thereof.

13. A gas turbine high temperature component according to claim 6, wherein an oxide-base ceramic is used as a material of the thermal barrier ceramic layer and the oxide-base ceramic essentially comprises $ZrO_2$ and at least one or more of additives MgO, CaO, $Y_2O_3$ or $CeO_2$.

14. A gas turbine high temperature component according according to claim 6, wherein an oxide-base ceramic is used as a material of the thermal barrier ceramic layer and the oxide-base ceramic essentially comprises at least one of $Al_2O_3$, $HfO_2$, $ThO_2$ or BeO.

15. A high temperature component according to claim 5, wherein said surface temperature of the base material has a difference in temperature within 100° C. between portions thereof.

16. A high temperature component according to claim 5, wherein said thermal barrier coating comprises a thermal barrier ceramic layer and a thermal barrier characteristic of the thermal barrier ceramic layer is controlled by varying a porosity thereof at portions thereof.

17. A gas turbine high temperature component comprising:

a metal base material made of a high resistant alloy essentially consisting of at least one of Ni-base, Co-base or Fe-base; and a thermal barrier coating coated on a surface of the metal base material, wherein said thermal barrier coating has a thermal barrier characteristic adapted to an environment to which a high temperature component is exposed so as to substantially unify a surface temperature of the base material;

wherein the gas turbine high temperature component is at least one of a movable blade and a stationary blade; and wherein a surface temperature of the metal base material is made uniform by the thermal barrier characteristic of a porosity of a back side of the movable or stationary blade having a relatively high temperature is higher than a porosity of a belly side thereof.

18. A high temperature component comprising:

a metal base material made of a high resistant alloy essentially consisting of at least one of Ni-base, Co-base or Fe-base; and a thermal barrier coating coated on a surface of the metal base material, said thermal barrier comprising first and second layers, wherein the first layer comprising a MCrAlY alloy layer wherein M is selected from the group Cr, Co or Ni, and the second layer comprising $Y_2O_3$ partially stabilized $ZrO_2$ wherein said thermal barrier coating comprises a thermal barrier ceramic layer and wherein a thermal barrier characteristic of the thermal barrier ceramic layer is controlled by varying a thickness thereof at portions thereof.

19. A method of manufacturing a gas turbine high temperature component comprising the steps of:

preparing a metal base material made of a high resistant alloy essentially consisting of at least one of Ni-base, Co-base or Fe-base; and applying a thermal barrier coating comprising a first layer comprising a MCrAlY alloy layer wherein M is selected from the group Cr, Co or Ni, and a second layer comprising a thermal barrier ceramic layer of $Y_2O_3$ partially stabilized $ZrO_2$, on a surface of the metal base material; and varying a thermal layer barrier characteristic which varies over the surface of the metal base material, which provides an essentially uniform temperature over the surface of the base material and which comprises a profile of a thickness or porosity of the thermal barrier ceramic layer at predetermined portions thereof.

20. A method of manufacturing a gas turbine high temperature component according to claim 19, wherein the thermal barrier ceramic layer is formed by spraying a raw powder of a thermal barrier ceramic material at a high speed.

21. A method of manufacturing a gas turbine high temperature component according to claim 20, wherein the thermal barrier ceramic layer is sprayed in a state melted by applying a plasma.

22. A method of manufacturing a gas turbine high temperature component according to claim 20, wherein a supply amount of raw powder, a grain size of the raw powder, a feed rate of a thermal spraying gun, an angle of the thermal spraying gun, a spray distance and a spray power are optimized and a deposition rate which is a coating thickness formed per one pass is varied so as to vary a thickness or porosity of the thermal barrier ceramic layer depending upon portions to be sprayed.

23. A method of manufacturing a gas turbine high temperature component according to claim 20, wherein the raw powder of the thermal barrier ceramic is passed through a plate having a different space ratio so as to vary the deposition rate.

24. A method of manufacturing a gas turbine high temperature component according to claim 19, wherein in a case of forming a thermal barrier ceramic layer on a metal base material, a target material is heated and vaporized by means of an electron beam and the vapor thus obtained is deposited on the surface of the metal base material so as to form the thermal barrier ceramic layer.

* * * * *